United States Patent [19]
Ohkawa et al.

[11] Patent Number: 5,963,248
[45] Date of Patent: *Oct. 5, 1999

[54] AUTOMATIC TRACKING/IMAGE SENSING DEVICE

[75] Inventors: Jun Ohkawa; Hiroshi Kawamura, both of Tokyo; Tadafusa Tomitaka; Masakazu Koyanagi, both of Chiba; Naoyasu Hosonuma, Saitama, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/944,487

[22] Filed: Oct. 6, 1997

Related U.S. Application Data

[63] Continuation of application No. 08/617,131, Mar. 18, 1996, abandoned.

[30] Foreign Application Priority Data

Mar. 22, 1995 [JP] Japan ................................ 7-088852
Apr. 21, 1995 [JP] Japan ................................ 7-120554

[51] Int. Cl.[6] ............................................. H04N 5/225
[52] U.S. Cl. .......................... 348/169; 348/207; 359/700
[58] Field of Search ............................. 348/96, 169, 170, 348/171, 172, 117, 207, 224, 369; 382/103; 364/571; 324/207.12; 360/77.06; 359/700; H04N 5/225

[56] References Cited

U.S. PATENT DOCUMENTS 4,488,249   12/1984  Baker ................................. 364/571.04
4,818,939   4/1989   Takahashi et al. ................. 324/207.21
4,849,679   7/1989   Taft et al. ............................. 318/577
5,019,776   5/1991   Kawamata et al. ..................... 324/207
5,144,493   9/1992   Nomura .................................. 359/700
5,179,421   1/1993   Parker et al. ........................... 348/169
5,351,027   9/1994   Kawamata et al. .................... 338/32 R
5,365,269   11/1994  Holmes et al. ......................... 348/169
5,367,333   11/1994  Harriman ............................... 348/117
5,384,594   1/1995   Sieber et al. ........................... 348/169
5,530,771   6/1996   Maekawa ............................... 382/103
5,555,142   9/1996   Komai et al. ......................... 360/77.06
5,559,551   9/1996   Sakamoto et al. ...................... 348/169
5,666,158   9/1997   Sekine et al. ........................... 348/224

Primary Examiner—Bryan Tung
Assistant Examiner—Gims S. Philippe
Attorney, Agent, or Firm—Jay H. Maioli

[57] ABSTRACT

The automatic tracking/image sensing device includes a lens barrel for supporting an image sensing lens, a support mechanism for supporting the lens barrel in such a way that the lens barrel can be moved, driver for driving the lens barrel, an image sensor installed at a location in close proximity to an image created by the image sensing lens, a video signal processor for generating a video signal based on a signal output by the image sensor, an object position detector for computing a positional deviation from the current position of the object to the center of the screen in accordance with the video signal generated by the video signal processor, a deflection detecting sensor for detecting the deflection of the lens barrel and a lens barrel posture controller for adjusting the angle of the lens barrel by using a driver in accordance with the positional deviation and the deflection. There can thus be provided an automatic tracking image sensing device with a simple configuration for automatic tracking by deflection correction.

9 Claims, 6 Drawing Sheets

FIG. 7A
MR OUTPUT

FIG. 7B
EXTRACTED STRAIGHT LINE PORTIONS

FIG. 7C
INTERPOLATION SIGNAL

AUTOMATIC TRACKING/IMAGE SENSING DEVICE

This is a continuation of application Ser. No. 08/617,131 filed Mar. 18, 1996, now abandoned.

BACKGROUND

1. Field of Invention

In general, the present invention relates to an image sensing device. In particular, the present invention relates to an automatic tracking/image sensing device typically mounted on an elevator, a car or the like for sensing the image of an image sensing target object while tracking the image sensing object.

2. Background of the Invention

Figure 1:
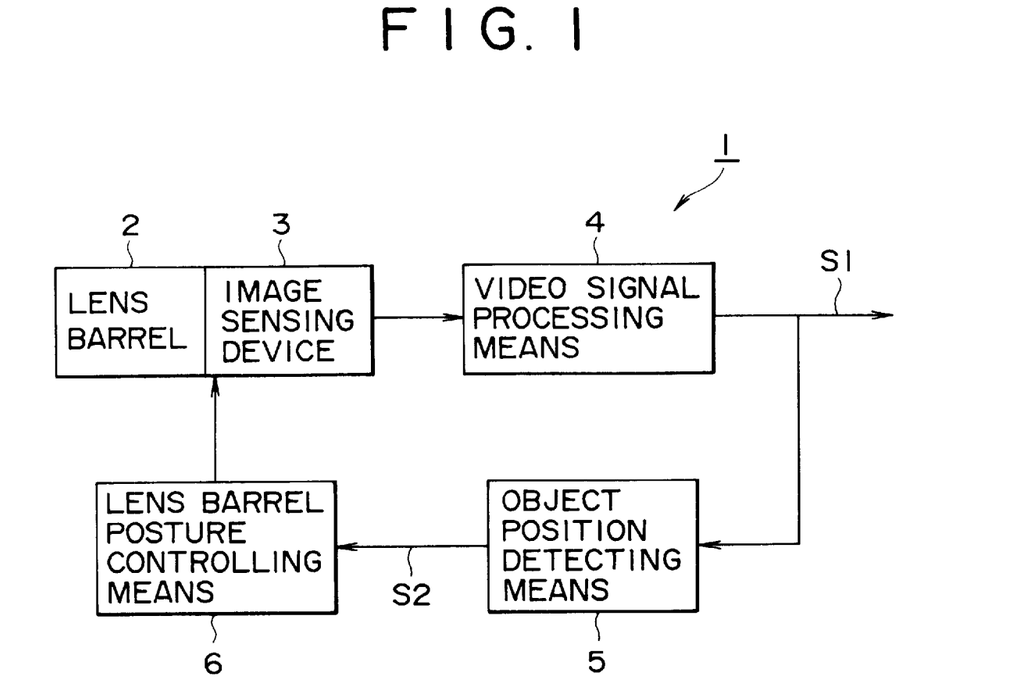
FIG. 1 is a block diagram of a typical conventional automatic tracking image sensing device.

The conventional automatic tracking/image sensing device 1 has a typical configuration shown in FIG. 1.

The automatic tracking/image sensing device 1 shown in FIG. 1 comprises: a lens barrel 2; an image sensing device 3 attached to the lens barrel 2; a video signal processing means 4; an object position detecting means 5 for recognizing an image sensing target object on a screen created by a video signal generated by the video signal processing means 4, detecting the position thereof and calculating a moving direction and angle toward the center of the screen; and a lens barrel posture controlling means 6 for moving the lens barrel 2 in accordance with the moving direction and angle detected by the object position detecting means 5.

With the automatic tracking/image sensing device 1 having the configuration described above, an image of an image sensing object is created on a light receiving surface of the image sensing device 3 by means of a lens of the lens barrel 2. In other words, the image sensing device 3 outputs picture element data of the image sensing object. Then, the video signal processing means 4 generates a video signal S1 constituting a screen based pieces of the picture element data output by the image sensing device 3 and outputs the video signal S1 to an external monitor unit or the like.

Here, receiving the video signal S1 generated by the video signal processing means 4, the object position detecting means 5 recognizes the image sensing object on the screen and detects the position thereof. Then, the object position detecting means 5 computes the value of the positional deviation from the center of the screen, that is, the moving direction and angle to the center of the screen. Finally, the object position detecting means 5 outputs a control signal S2 representing the positional deviation.

Receiving the control signal S2 representing the positional deviation generated by the object position detecting means 5, the lens barrel posture controlling means 6 moves the lens barrel 2 in the horizontal and vertical directions. As a result, the image of the image sensing target object moves to the center of the screen photographed by the image sensing device 3 in the so-called automatic tracking operation.

In the automatic tracking/image sensing device 1 with the configuration described above, the lens barrel posture controlling means 6 employs a direct current or stepping motor as a driving means for moving the lens barrel 2 in the horizontal and vertical directions in order to control the posture of the lens barrel 2 through a reduction gear mechanism such as a gear transmission mechanism.

For this reason, the accuracy of the positioning of the lens barrel 2 by the posture control inevitably decreases due to a backlash of a toothed wheel of the reduction gear mechanism.

In addition, particularly in the case of a stepping motor, the stop position of the driving shaft thereof is determined for each step. As a result, the posture control's positional resolution of the lens barrel 2 deteriorates and the response speed decreases.

On the other hand, it is necessary to increase the response speed and enhance the positioning accuracy in order to correct deflection resulting from the posture control which is carried out while the automatic tracking is being performed. It is difficult, however, to correct such deflection in the configuration described above.

On top of that, since the configuration described above includes a reduction gear mechanism, the configuration of the lens barrel posture controlling means 6 becomes complex, giving rise to a problem that the automatic tracking/image sensing device inevitably becomes large in size.

As another example, there is a configuration for correcting deflection resulting from the posture control wherein the lens barrel 2 is supported by a gimbals mechanism, being driven directly by a driving means and a deflection detecting sensor provided on the lens barrel 2 detects the magnitude of the deflection. Since the deflection detecting sensor is relatively large in size, however, the moving part of the lens barrel 2 also inevitably increases in size as well. As a result, such a configuration works against any attempt made to reduce the size of the lens barrel 2.

In still another configuration, a deflection detecting sensor is provided on the stationary portion of the image sensing device. In this case, however, a sensor for detecting the angular speed of the lens barrel itself is required, giving rise to another problem that the configuration inevitably becomes complicated.

SUMMARY OF THE INVENTION

According to the present invention, a lens barrel posture controlling means adjusts angles in the pitching and yawing directions by controlling a driving means in accordance with a positional deviation output by an object position detecting means and a deflection generated by a deflection detecting sensor. As a result, an image of an object created on a light receiving surface of an image sensing means is always positioned at about the center of the light receiving surface.

Even the image of a moving object is always positioned at about the center of a screen created in an image sensing operation carried out by an image sensing means. At the same time, the lens barrel posture controlling means carries out deflection correction, allowing stable automatic tracking of the object to be implemented.

As a result, even if the user does not look through a finder, the user can carry out image sensing with the image of the object always positioned at the center of the screen. Even if the automatic tracking/image sensing device is mounted on a car, a helicopter or the like, vibration caused by the vehicle can be eliminated by deflection correction, allowing a stable image to be resulted in with no deflection.

DESCRIPTION OF THE INVENTION

The present invention will become apparent from the following detailed description of preferred embodiments with reference to accompanying diagrams shown in FIGS. 2 to 8.

It should be noted that the embodiments described below are no more than preferred embodiments having a variety of restrictions which are good for technical reasons. None the less, the scope of the present invention is by no means restricted to such preferred embodiments as long as there is no description in this specification that specifically excludes other alternatives to the preferred embodiments.

Figure 2:
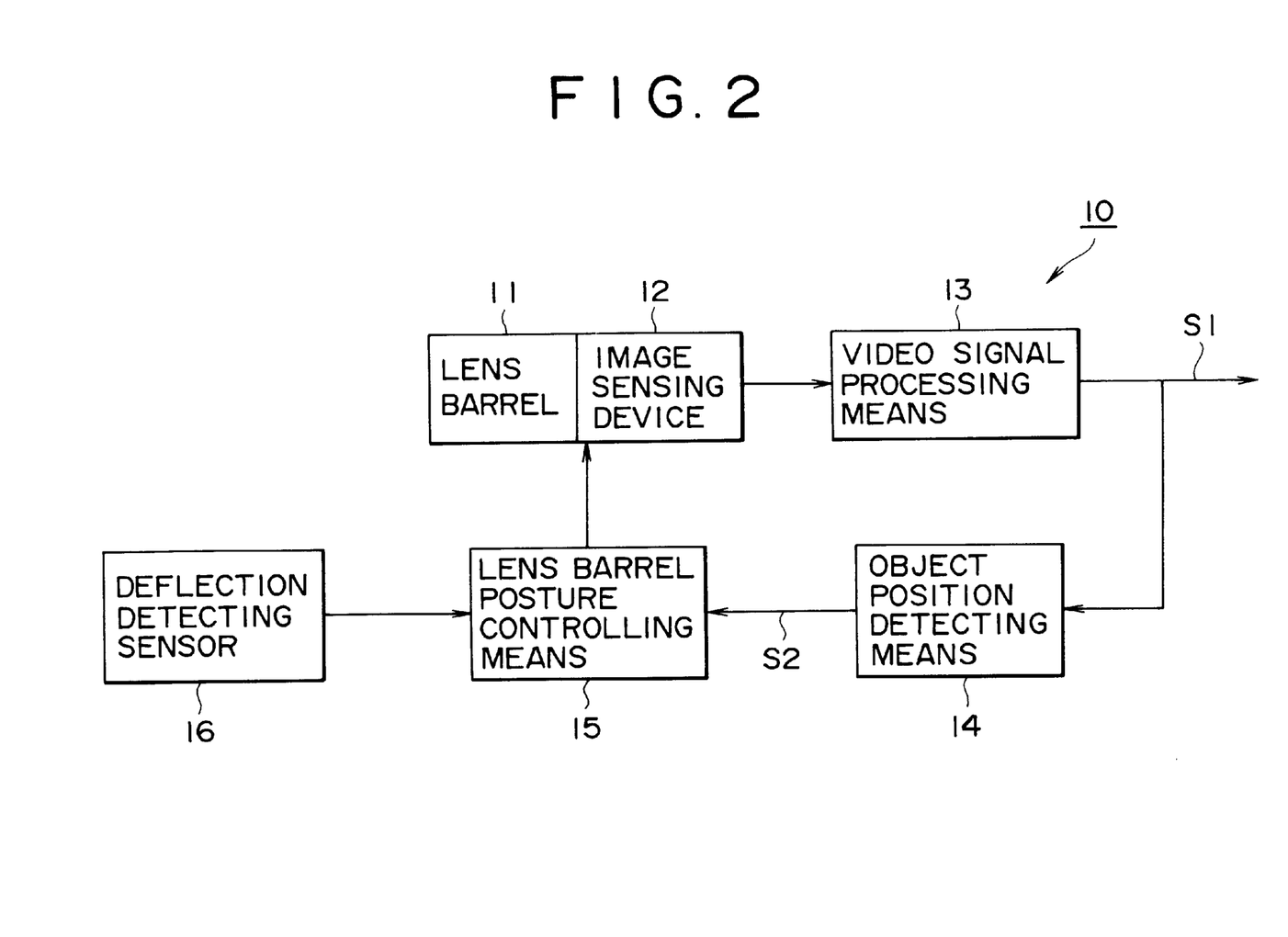
FIG. 2 is a block diagram of an embodiment implementing an automatic tracking/image sensing device in accordance with the present invention.

FIG. 2 is a block diagram of an embodiment implementing an automatic tracking image sensing device in accordance with the present invention.

An embodiment implementing an automatic tracking/image sensing device 10 in accordance with the present invention is shown in FIG. 2.

The automatic tracking/image sensing device 10 shown in the figure is designed into an on-board automatic tracking video camera typically mounted in a car. As is shown in the figure, the automatic tracking/image sensing device 10 comprises: a lens barrel 11; an image sensing device 12 attached to the lens barrel 11; a video signal processing means 13; an object position detecting means 14 for recognizing an image sensing target object on a screen created by a video signal generated by the video signal processing means 13, detecting the position thereof and calculating a moving direction and angle toward the center of the screen; a lens barrel posture controlling means 15 for moving the lens barrel 11 in accordance with the moving direction and angle detected by the object position detecting means 14; and a deflection detecting sensor 16 for detecting the size of the deflection of the lens barrel 11.

Figure 4:
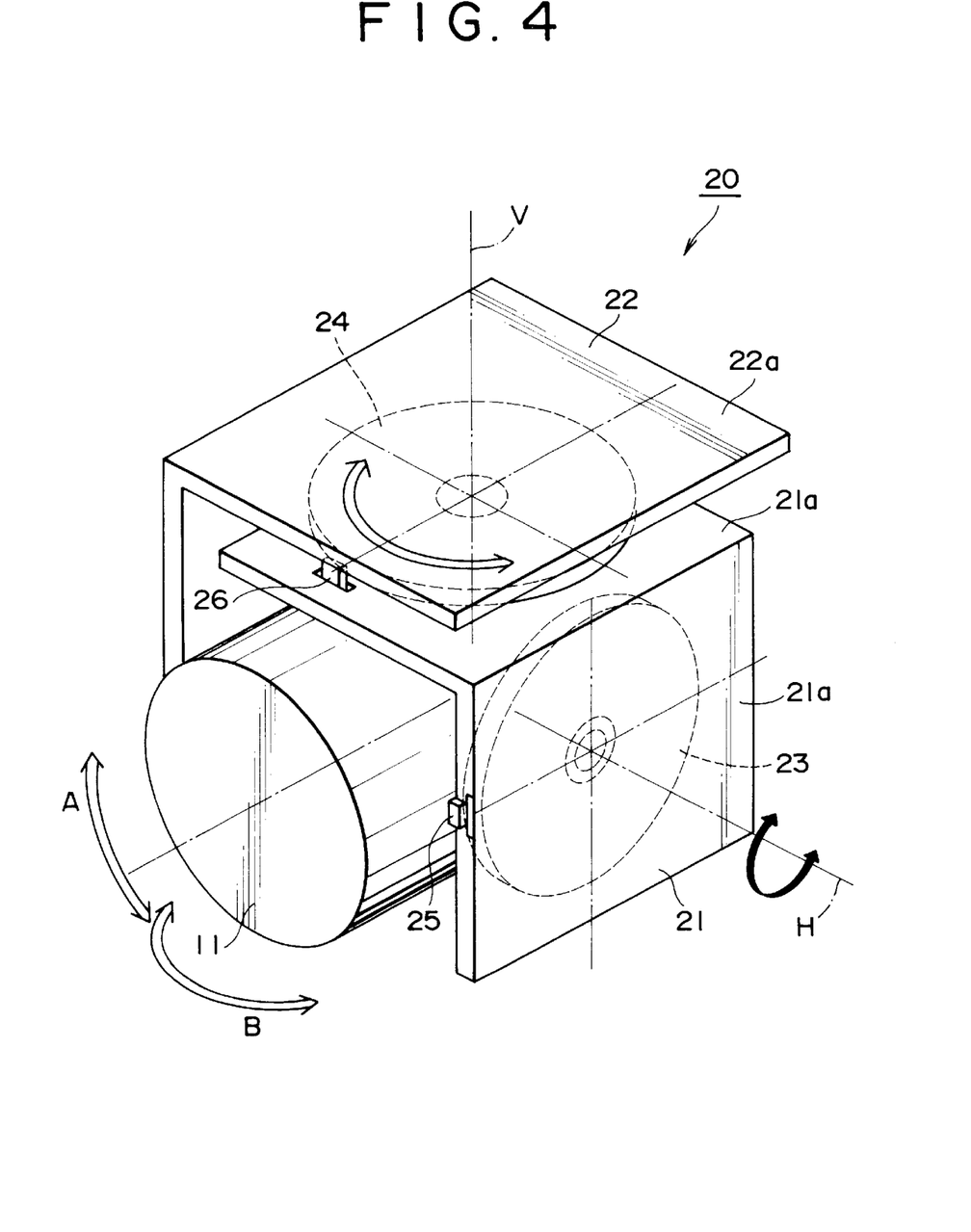
FIG. 4 is a rough perspective view of the configuration of a lens barrel posture controlling means employed in the automatic tracking/image sensing device shown in FIG. 2.

Supporting an image sensing lens not shown in the figure, the lens barrel 11 is held in such a way that the lens barrel 11 can move in a pitching direction A, a rotational direction with the horizontal shaft H taken as a center, and a yawing direction B, a rotational direction with the vertical shaft V taken as a center, as is shown in FIG. 4. The lens barrel 11 can be moved in both directions by a driving means to be described later.

The image sensing device 12, which is typically a solid-state image sensing element, is provided at a location in close proximity to the image sensing lens. The image sensing device 12 scans an image of an image sensing object created on a light receiving surface thereof, converting the image into an electrical signal which appears on picture elements laid out to form a matrix. In this way, the image sensing device 12 outputs picture element data.

Receiving picture-element data signals generated by the image sensing device 12, the video signal processing means 13 generates a video signal S1 for forming a screen and outputs the video signal S1 to an external monitor unit or the like.

Receiving the video signal S1 generated by the video signal processing means 13, the object position detecting means 14 recognizes the image sensing object on the screen and detects the position thereof. Then, the object position detecting means 14 computes the value of the positional deviation from the center of the screen, that is, the moving direction and angle to the center of the screen. Finally, the object position detecting means 14 outputs a control signal S2 representing the positional deviation.

Receiving the control signal S2 representing the positional deviation generated by the object position detecting means 14, the lens barrel posture controlling means 15 moves the lens barrel 11 in the pitching and yawing directions. As a result, the image of the image sensing target object moves to the center of the screen photographed by the image sensing device 12 in the so-called automatic tracking operation.

Fixed on the body of the automatic tracking device 10, the deflection detecting sensor 16 is used for detecting the magnitude of the deflection of the device as a whole and outputting a detection signal S3, which represents the magnitude of the deflection of the device, to the lens barrel posture controlling means 15.

Figure 3:
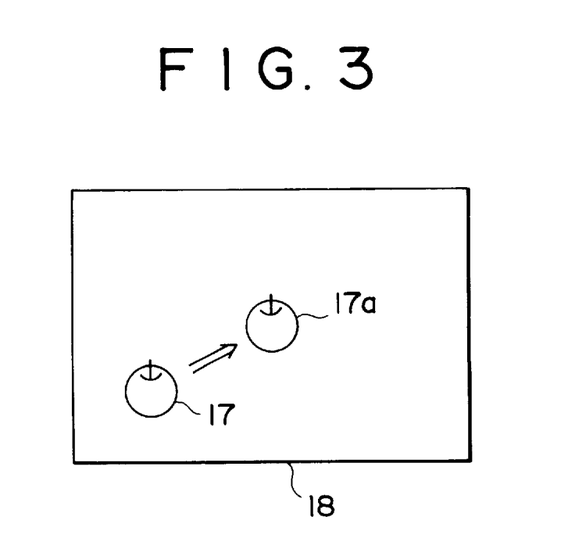
FIG. 3 is a rough diagram showing an image resulting from a tracking operation carried out by the automatic tracking/image sensing device shown in FIG. 2.

Receiving the control signal S2 representing the positional deviation from the object position detecting means 14 and the detection signal S3 generated by the deflection detecting sensor 16, the lens barrel posture controlling means 15 controls the driving means of the lens barrel 11 in order to move the lens barrel 11 in the pitching and yawing directions. With this control operation, an object 17 serving as an image sensing target is moved to a position 17a in close proximity to the center of a screen 18 created by the image sensing device 12 in the so-called automatic tracking as is shown in FIG. 3.

At that time, receiving the detection signal S3 representing the deflection from the deflection detecting sensor 16, the lens barrel posture controlling means 15 carries out the automatic tracking by correcting the deflection. As a result, stable automatic tracking of the object 17 can be performed.

FIG. 4 shows a typical configuration of a gimbals mechanism 20 for supporting the lens barrel 11 employed in the lens barrel posture controlling means 15 in such a way that the lens barrel 11 can be moved in the pitching and yawing directions.

As is shown in the figure, the gimbals mechanism 20 comprises an inner frame 21 for supporting the lens barrel 11 in such a way that the lens barrel 11 can rotate around the horizontal H. an outer frame 22 for supporting the inner frame 21 in such a way that the inner frame 21 can rotate around the vertical shaft V, pitching and yawing actuators 23 and 24, a vertical position sensor 25 and a horizontal position sensor 26.

The cross section of the inner frame 21 resembles the L character turned upside down. On each side of vertical portion 21a and upper horizontal portion 21b, a stator is fixed and the stators fixed on the side vertical portion 21a and the upper horizontal portion 21b are equipped with coils for the actuators 23 and 24 respectively.

The rotor of the actuator 23 has a circular form. A rotor magnet magnetized into a number of poles in the circumference direction is provided. It should be noted that the rotor magnet itself is not shown in the figure. The rotor of the actuator 23 is fixed on the lens barrel 11.

When the rotor of the actuator 23 is driven into rotation, the lens barrel 11 rotates around the rotation shaft of this rotor, that is, around the horizontal shaft H.

Similarly, the cross section of the outer frame 22 also resembles the L character turned upside down. The outer frame 22 is firmly attached to the fixed portion of the automatic tracking/image sensing device 10. The rotor of the actuator 24 is provided on the back surface of the upper horizontal portion 22a of the outer frame 22.

Figure 5:
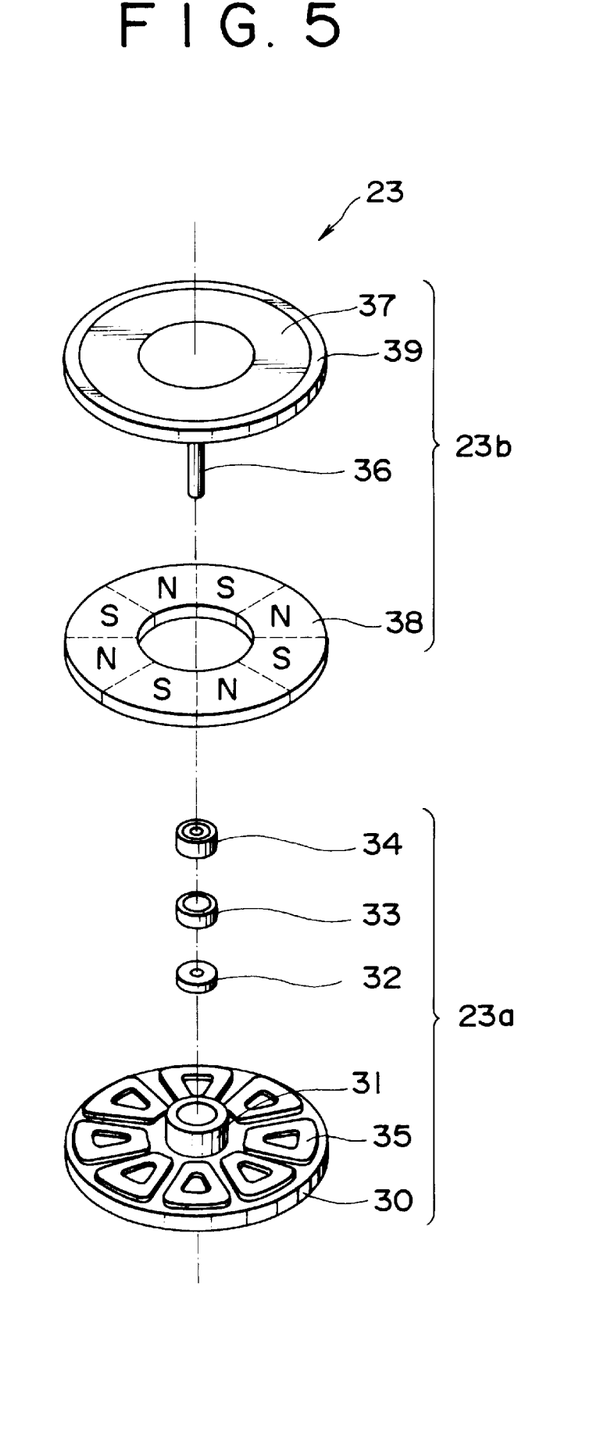
FIG. 5 is a perspective view of a disassembled driving means employed in the lens barrel posture controlling means shown in FIG. 4.

As such, the lens barrel 11 is supported in such a way that the lens barrel 11 can make a rotation around the horizontal shaft H relative to the inner frame 21. The inner frame 21 is supported in such a way that the inner frame 21 can make a rotation around the vertical shaft relative to the outer frame 22. The electrical conductivity to stator coils 35 of the actuators 23 and 24 driven by a control signal generated by the lens barrel posture controlling means 15, which stator coils 35 are shown in FIG. 5, and the magnetic flux produced by the rotor magnet interact with each other. As a result, the rotors of the actuators 23 and 24 are driven into rotation, driving and controlling the movement of the lens barrel 11 around the horizontal and vertical shafts H and V.

A typical configuration of the actuator 23 is shown in FIG. 5.

As is shown in the figure, the actuator 23 comprises a fixed stator 23a and a rotor 23b capable of making a rotation relative to the stator 23a.

The stator 23a comprises a motor board 30 having a circular form, a housing 31, a shaft bearing 32, a sleeve 33 and a bearing 34. The housing 31, the shaft bearing 32, the sleeve 33 and the bearing 34 are provided on the center of the motor board 30. The stator coils 35 are laid out on the surface of the motor board 30.

The rotor 23b is designed to have a circular shape. The rotor 23b comprises a rotation shaft 36 extended vertically through the center of the rotor 23b, a rotor case 37, to which the rotation shaft 36 is fixed, a multi-pole rotor magnet 38 attached to the lower surface of the rotor case 37 and a multi-pole rotation-angle detecting magnet 39 provided on the circumference surface of the rotor case 37.

The housing 31 accommodates the shaft bearing 32, the sleeve 33 and the bearing 34. The shaft bearing 32 has a shaft bearing portion for supporting the rotation shaft 36 of the rotor 23b in such a way that the rotation shaft 36 can rotate.

The stator coils 35 are eight plane coils which are laid out on the motor board 30 in the circumference direction in such a way that each of the stator coils 35 interfaces with one pole of the rotor magnet 38. It should be noted, however, that the number of stator coils does not have to be eight and the stator coils 35 can be pattern coils created on the motor board 30. The stator coils 35 are configured in such a way that, when currents flow through them, lines of magnetic force are generated in a direction perpendicular to the motor board.

The multi-pole rotor magnet 38 has a ring-like shape with and is magnetized into a number of N and S poles laid out alternately in the circumference direction at predetermined angular intervals.

As such, the rotor 23b is supported by the shaft bearing 32 in such a way that the rotor 23b can be driven into rotation relative to the stator 23a including the stator coils 35.

The other actuator 24 has the same configuration as that of the actuator 23.

The vertical position sensor 25 employed in this embodiment is a magnetic sensor which is firmly attached to the inner frame 21 in such a way that the vertical position sensor 25 faces the multi-pole rotation-angle detecting magnet 39 which is firmly attached to the inner frame 21. The vertical position sensor 25 detects the magnetization pattern of the multi-pole rotation-angle detecting magnet 39, that is, the multi-pole magnetization pattern with S and N poles laid out alternately at predetermined rotational angular intervals. That is to say, the vertical position sensor 25 detects the rotational angle of the rotor 23b employed in the actuator 23 relative to the inner frame 21. By doing so, the rotational angle of the lens barrel 11 around the horizontal shaft H or the positional displacement in the pitching direction can be detected.

Likewise, the horizontal position sensor 26 employed in this embodiment is also a magnetic sensor which is firmly attached to the outer frame 22 in such a way that the horizontal position sensor 26 faces the multi-pole rotation-angle detecting magnet 39 on the circumference of the rotor of the actuator 24. The horizontal position sensor 26 detects the multi-pole magnetization pattern of the multi-pole rotation-angle detecting magnet 39. That is to say, the horizontal position sensor 25 detects the rotational angle of the rotor of the actuator 24 relative to the inner frame 21. By doing so, the rotational angle of the lens barrel 11 around the vertical shaft V or the positional displacement in the yawing direction can be detected.

Typically, the vertical and horizontal position sensors 25 and 26 are each a magneto-resistive device or the so-called MR device such as a thin-layer magnetic head exhibiting a magnetic resistance effect. The sensors 25 and 26 make use of the fact that the resistance of the MR device is dependent upon the angle formed by the direction of the magnetization of the MR device and the direction of a current flowing through the MR device. Ideally, the magneto-resistive device is designed so as to generate three sinusoidal signals having phases different from each other by 120 degrees.

Figure 6:
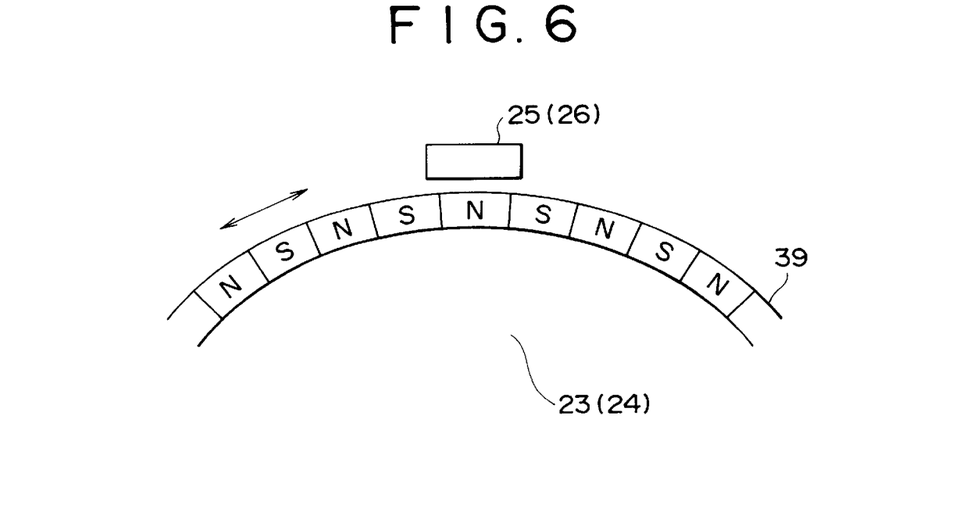
FIG. 6 is a rough diagram showing the principle of operation of a position sensor utilizing a magneto-resistive device which position sensor is employed in the lens barrel posture controlling means shown in FIG. 4.

As is shown in FIG. 6, the vertical and horizontal position sensors 25 and 26, which are each made up of a magneto-resistive device as is described above, are installed in such a way that the vertical and horizontal position sensors 25 and 26 face the multi-pole magnetization pattern of the multi-pole rotation-angle detecting magnets 39 employed in the actuators 23 and 24 respectively. When the actuators 23 and 24 are driven in order to control the posture of the lens barrel 11, the rotors thereof rotate, causing the multi-pole magnetization pattern of the multi-pole rotation-angle detecting magnets 39 to rotate in directions denoted by arrows. As a result, signals output by the vertical and horizontal position sensors 25 and 26 change.

The variations in signals output by the vertical and horizontal position sensors 25 and 26 are processed by a signal processing circuit not shown in the figure in order to detect the posture and the position of the lens barrel 11. The processing carried out by this signal processing circuit is described as follows. As is shown in a top diagram A of FIG. 7, signals output by the vertical or horizontal position sensors 25 or 26, which are each made up of a magneto-resistive device as is described above, are three sinusoidal waves having phases different from each other by 120 degrees. By counting the number of points at which two adjacent signals cross each other, the rotation-angle position of the lens barrel 11 can roughly be obtained sequentially as a first phase, second phase, third phase and so on.

Figure 7A:
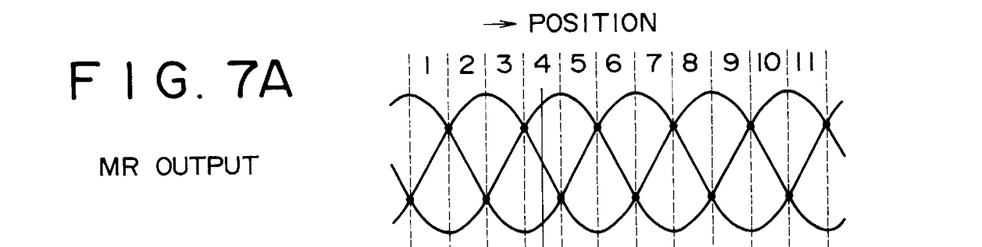
FIG. 7 shows graphs of processing of signals output by the position sensor shown in FIG. 6.
Figure 7B:
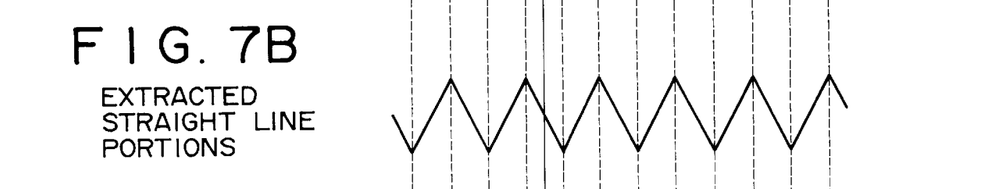
Figure 7C:
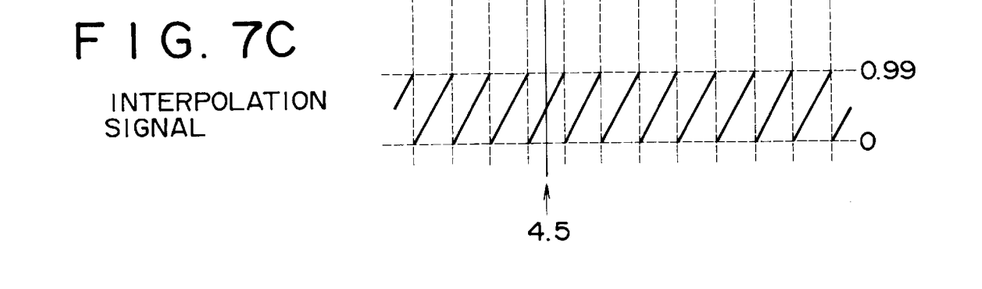

Then, all-but-straight-line portions between the above cross points are taken out to give a middle diagram B of FIG.

7 which shows a signal with a shape resembling a triangle. The sawtooth or interpolation signal shown in a bottom diagram C of FIG. 7 is obtained by inverting upside down the falling right sides or the even phase portions of the triangular wave shown in the middle diagram B.

The interpolation signal has a waveform in which each phase has the same shape resembling a straight line. By equally dividing the amplitude of the interpolation signal into 100 equal divisions with values of 0 and 0.99 assigned to the lowest and highest points of the interpolation signal respectively, the detection of the magnitude of the interpolation signal allows positions corresponding to the 100 equal divisions of each phase to be monitored. In the case of FIG. 7, for example, the detection of the interpolation signal with a value of 0.5 in the fourth phase indicates that the lens barrel 11 is located, at a position corresponding to a value of 4.5.

As a result, the accuracy and resolution of the rotation-angle position of the lens barrel 11 around the vertical and horizontal shafts V and H are enhanced, increasing the accuracy of the detection signal representing the present position of the object as well.

In the gimbals mechanism 20 described above, by flowing a current through each of the stator coils 35 of the actuators 23 and 24, the actuators 23 and 24 are controlled and driven. Accordingly, the lens barrel 11 is driven into rotation relative to the inner frame 21 around the horizontal shaft H in the pitching direction and the inner frame 21 is driven into rotation relative to the outer frame 22 around the vertical shaft V in the yawing direction. As a result, the lens barrel 11 moves in the pitching and yawing directions, adjusting the angular position thereof.

Figure 8:
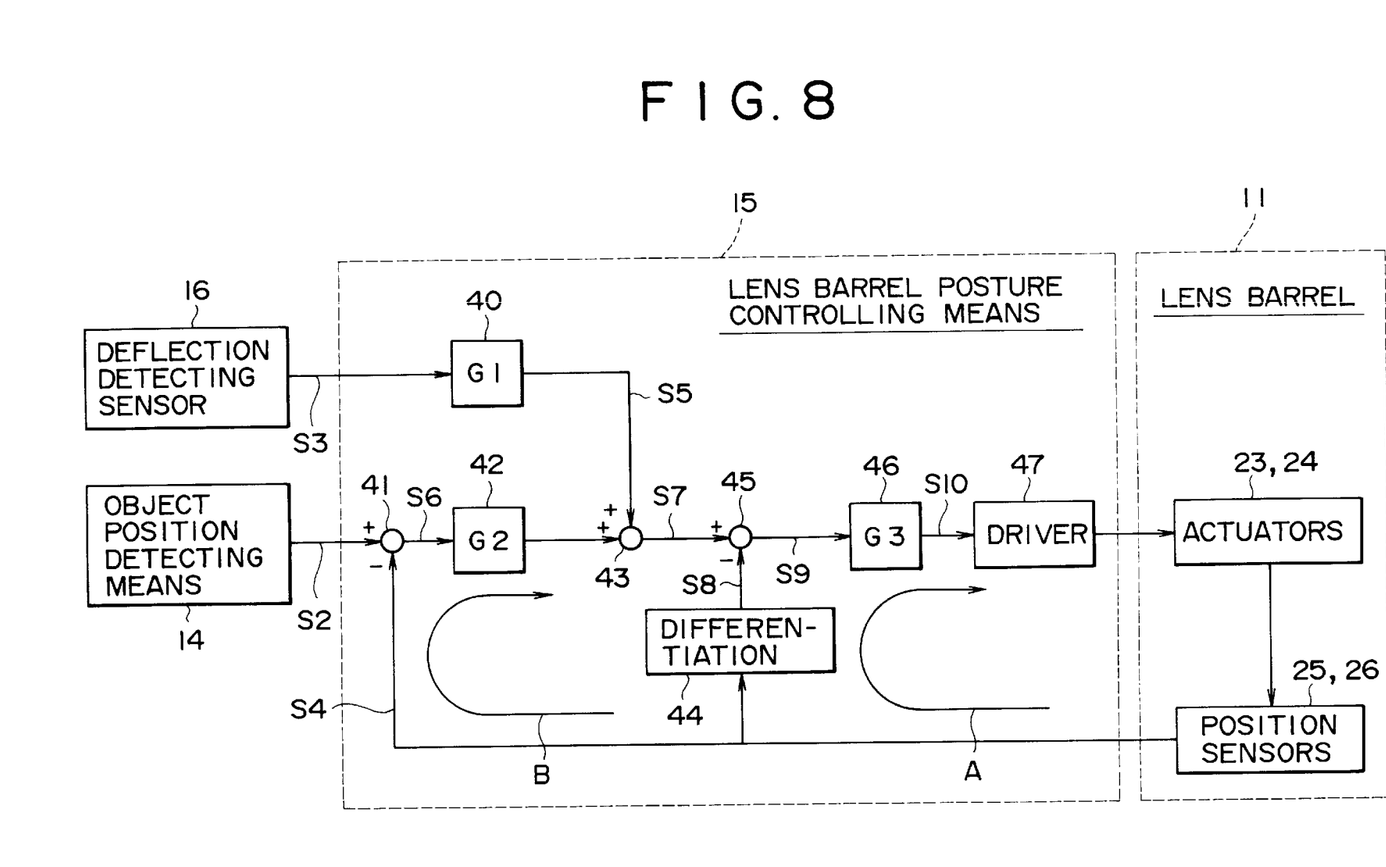
FIG. 8 is a block diagram of a detailed configuration of the lens barrel posture controlling means shown in FIG. 4.

An actual configuration of the lens barrel posture controlling means 15 is shown in FIG. 8.

As is shown in the figure, the lens barrel posture controlling means 15 comprises an adjustment circuit 40 for adjusting the gain of the detection signal S3 generated by the deflection detecting sensor 16, a subtracter 41 for subtracting the detection signal S4 output by the position sensors 25 and 26 from the control signal S2 representing the positional deviation produced by the object position detecting means 14, an adjustment circuit 42 for adjusting the gain of a signal (S2–S4) output by the subtracter 41, an adder 43 for adding a signal output by the adjustment circuit 40 to a signal output by the adjustment circuit 42, a differential circuit 44 for differentiating the detection signal S4 generated by the position sensors 25 and 26, a subtracter 45 for subtracting a signal output by the differential circuit 44 from a signal produced by the adder 43, an adjustment circuit: 46 for adjusting the gain of a signal output by the subtracter 45 and a driver 47 for outputting a driving/control signal to the actuators 23 and 24 in accordance with a signal output by the adjustment circuit 46.

The adjustment circuit 40 converts the detection signal S3 representing an angular speed of the deflection generated by the deflection detecting sensor 16 into a speed value, outputting a signal S5 representing the speed value.

The subtracter 41 subtracts the detection signal S4 output by the position sensors 25 and 26 to represent the present position of an object from the control signal S2 representing the positional deviation produced by the object position detecting means 14 which positional deviation represents a target position of the object, producing a relative positional deviation signal S6.

The adjustment circuit 42 converts the relative positional deviation signal S6 produced by the subtracter 41 into a speed value.

The adder 43 adds the target speed signal S5 output by the adjustment circuit 40 to a signal output by the adjustment circuit 42 to represent a speed, producing a signal S7 representing a position corrected target speed.

By differentiating the detection signal S4 generated by the position sensors 25 and 26 to represent the current position of the object, the differential circuit 44 finds the magnitude of momentum per unit time made by the lens barrel 11 in order to generate a signal S8 representing the current speed.

The subtracter 45 subtracts the current speed signal S8 output by the differential circuit 44 from the signal S7 output by the adder 43 to represent the position corrected target speed, generating a signal S9 representing an actual driving speed of the lens barrel 11.

The adjustment circuit 46 adjusts the gain of the signal S9 output by the subtracter 45, generating a command signal S10.

The driver 47 outputs a driving/control signal to the actuators 23 and 24 in accordance with the signal S10 generated by the adjustment circuit 46, driving the actuators 23 and 24.

Having a configuration described above, the lens barrel posture controlling means 15 carries out the following operations.

As is shown by a loop denoted by an arrow A in FIG. 8, the command signal S10 is provided to the driver 47 in accordance with the signal S8, which is obtained through the differential circuit 44 as a current speed, in order to control the speed of the lens barrel 11. In addition, as is shown by a loop denoted by an arrow B in the figure, the command signal S10 is provided to the driver 47 in accordance with the signal S6 representing a positional deviation in order to control the position of the lens barrel 11.

In the loop A, the adder 43 adds the signal S5 originally generated by the deflection detecting sensor 16 to a signal output by the adjustment circuit 42 to represent a relative speed, producing the signal S7 representing a target speed. Accordingly, the target speed signal S7 is generated as a signal with the deflection angle of the automatic tracking/image sensing device 10 corrected. Since the command signal S10 provided to the driver 47 is generated in accordance with the target speed signal S7, the lens barrel 11 can be controlled and driven by the actuators 23 and 24 in such a way that relative deflection is eliminated.

As a result, since automatic tracking of the object is carried out while the deflection of the automatic tracking/image sensing device itself is being corrected, it is possible to perform stable automatic tracking of a moving object.

In addition, in the loop B, since the subtracter 41 subtracts the detection signal S4 output by the position sensors 25 and 26 to represent the present position of an object from the control signal S2 output by the object position detecting means 14 to represent the positional deviation, the obtained target speed signal S7 is position corrected. As a result, when the photographer performs panning or tilting or the like, the lens barrel 11 is prevented from being corrected in a direction opposite to the panning or tilting.

As described above, in this embodiment, the vertical and horizontal position sensors 25 and 26 are each a magneto-resistive device which is designed to generate three sinusoidal signals having phases different from each other by typically 120 degrees. It should be noted, however, that the vertical and horizontal position sensors 25 and 26 do not have to be such a magneto-resistive device. As long as the device generates a plurality of signals with phases different from each other, the rotation-angle position of the lens barrel 11 can be detected with a high degree of accuracy on the basis of the phase difference.

In addition, the embodiment implements an automatic tracking/image sensing device which is designed into an on-board automatic tracking video camera typically mounted in a car. It should be noted, however, that the scope of the present invention is not limited to such an application. The automatic tracking/image sensing device can be an on-board automatic tracking video camera mounted in a helicopter. When carrying out automatic tracking of a car running on a road by means of an on-board automatic tracking video camera mounted in a helicopter, for example, the automatic tracking of the car can be done with ease and effects of vibration caused by the helicopter can be eliminated by deflection correction, As a result, a stable automatic tracking and image sensing of the car can be performed.

On top of that, the automatic tracking/image sensing device can also be used as a monitoring camera mounted in an elevator for example. In this case, people in the elevator can be automatically tracked and their images picked up. At the same time, effects of vibration caused by the elevator can be eliminated by the deflection correction.

What is claimed is:

1. An automatic tracking/image sensing device comprising:

a lens barrel for supporting an image sensing lens;

a support mechanism for supporting said lens barrel in such a way that said lens barrel can be moved about a vertical axis and a horizontal axis;

driving means for driving said lens barrel in yawing and pitching directions about said vertical and horizontal axes, respectively, to change a posture of said lens barrel;

image sensing means installed at a location in close proximity to an image created by said image sensing lens for sensing the image and producing picture element data therefrom;

video signal processing means for generating a video signal constituting a screen and based on the picture element data output by said image sensing means;

object position detecting means for detecting the current position of an object and computing a positional deviation from the current position of said object to the center of said screen in accordance with said video signal generated by said video signal processing means;

a plurality of angular position sensors for detecting an angular position of said lens barrel in said yawing and pitching directions about said respective vertical and horizontal axes;

lens barrel posture controlling means for adjusting an angle of said lens barrel about at least one of said vertical and horizontal axes of said lens barrel; and a deflection detecting sensor attached to a stationary portion of said automatic tracking/image sensing device for detecting a deflection of said lens barrel resulting from the angle adjustment by said posture controlling means, wherein said angle about said at least one of said vertical and horizontal axes of said lens barrel is adjusted by activating said driving means in accordance with said positional deviation output by said object position detecting means, said deflection of said lens barrel detected by said deflection detecting sensor, and said angular positions detected by said angular position sensors, without correcting in a direction opposite to a direction of panning or tilting specified by a user.

2. An automatic tracking/image sensing device according to claim 1 wherein said purality of predetermined axes comprise pitching and yawing axes.

3. An automatic tracking/image sensing device according to claim 2 wherein said driving means directly drives said lens barrel.

4. An automatic tracking/image sensing device according to claim 2 wherein said lens barrel posture controlling means differentiates changes in signal output by said plurality of position sensors in order to find a current speed of said lens barrel.

5. An automatic tracking/image sensing device accroding to claim 4 wherein said lens barrel posture controlling means subtracts a signal output by said plurality of position sensors from a positional deviation output by said object position detecting means in order to find a speed of said object relative to said current speed.

6. An automatic tracking/image sensing device according to claim 5 wherein said lens barrel posture controlling means detects a desired deflection speed of said lens barrel from a deflection value output by said deflection detecting sensor and adds said desired deflection speed to said relative speed to obtain a target speed.

7. An automatic tracking/image sensing device according to claim 6 wherein said position sensors each comprise a rotation detecting multi-pole magnet having a circular from and surrounding a rotation shaft of said lens barrel and having firmly attached thereto a magnet-resistive device facing said rotation detecting multi-pole magnet, wherein said magneto-resistive device generating a plurality of signals with respective phases different from each other.

8. An automatic tracking/image sensing device according to claim 7 wherein said lens barrel posture controlling means differntiates changes in a signal output by said position sensors in order to find said current speed of said lens barrel and subtracts said current speed from said target speed to obtain a target speed change.

9. An automatic tracking/image sensing device according to claim 8 wherein said lens barrel posture controlling means generates a driving signal to control said driving means to alter said lens barrel speed on said target speed change.

* * * * *